(12) United States Patent
Komatsu

(10) Patent No.: US 8,652,565 B2
(45) Date of Patent: Feb. 18, 2014

(54) SEALING METHOD OF SEALING DISPERSION LIQUID CONTAINING AND ELECTROPHORETIC PARTICLES, AND ELECTROPHORETIC DISPLAY

(75) Inventor: Harunobu Komatsu, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 603 days.

(21) Appl. No.: 12/732,539

(22) Filed: Mar. 26, 2010

(65) Prior Publication Data

US 2011/0025583 A1 Feb. 3, 2011

(30) Foreign Application Priority Data

Jul. 29, 2009 (JP) ................................ 2009-176719
Jan. 21, 2010 (JP) ................................ 2010-011135

(51) Int. Cl.
*B05D 5/12* (2006.01)
*G03G 17/04* (2006.01)
*G02B 26/00* (2006.01)

(52) U.S. Cl.
USPC ................ 427/58; 427/108; 430/32; 359/296

(58) Field of Classification Search
USPC ................... 345/173, 174; 178/18.5; 427/58; 359/237, 296
See application file for complete search history.

(56) References Cited

U.S. PATENT DOCUMENTS

| 2002/0188053 | A1 | 12/2002 | Zang et al. | |
|---|---|---|---|---|
| 2003/0176557 | A1 | 9/2003 | Liang et al. | |
| 2003/0222842 | A1* | 12/2003 | Yuasa | 345/107 |
| 2005/0179983 | A1* | 8/2005 | Sakai et al. | 359/296 |
| 2005/0259313 | A1 | 11/2005 | Wang et al. | |
| 2006/0198422 | A1* | 9/2006 | Chopra et al. | 374/158 |
| 2008/0165411 | A1 | 7/2008 | Wang et al. | |

FOREIGN PATENT DOCUMENTS

| JP | A-5-165064 | 6/1993 |
|---|---|---|
| JP | A-2005-509690 | 4/2005 |
| JP | A-2006-518881 | 8/2006 |
| JP | A-2007-537493 | 12/2007 |
| WO | WO 2004/077134 A2 | 10/2004 |

* cited by examiner

*Primary Examiner* — Dah-Wei Yuan
*Assistant Examiner* — Jose Hernandez-Diaz
(74) *Attorney, Agent, or Firm* — Oliff PLC

(57) ABSTRACT

A sealing method is applicable to a cell matrix equipped with a plurality of cells spatially divided by a partition for sealing dispersion liquid containing hydrophobic dispersion medium and electrophoretic particles dispersed therein in the cells. The sealing method includes: supplying the dispersion liquid in the cells through an opening section of a space defined by the partition; and forming a sealing layer at an exposed portion of the dispersion liquid in the opening section, using a polymer reaction at an interface with water.

13 Claims, 7 Drawing Sheets

SEALING METHOD OF SEALING DISPERSION LIQUID CONTAINING AND ELECTROPHORETIC PARTICLES, AND ELECTROPHORETIC DISPLAY

The entire disclosure of Japanese Patent Application Nos: 2009-176719, filed Jul. 29, 2009 and 2010-011135, filed Jan. 21, 2010 are expressly incorporated by reference herein.

BACKGROUND

1. Technical Field

The present invention relates to electrophoretic display technology.

2. Related Art

When electrical fields are applied to a dispersion liquid (also referred to as a "dispersion system") in which charged particles are dispersed in a solution (dispersion medium), the particles move (or electrophoretically migrate) in the dispersion medium by a Coulomb force. This phenomenon is called electrophoresis, and electrophoretic display devices (EPDs) that display desired information including images using the electrophoresis are known.

As an example structure of EPD, an EPD having a pair of substrates wherein a space between the substrates is divided by partitions into a plurality of spaces (cells), and a dispersion system containing charged particles (electrophoretic particles) and dispersing medium sealed in each of the cells is known. Such an EPD can be manufactured through, for example, filling the dispersion system in each of the cells, and sealing an opening section of each of the cells. For example, Japanese laid-open patent application HEI 5-165064 (Patent Document 1) and Published Japanese Translation of PCT application 2005-509690 (Patent Document 2) are related art pertaining to the method described above.

According to Patent Document 1, each cell is closed (sealed) through placing a flexible electrode plate over the cells in a manner to cover an opening of each of the cells, and applying a pressure force on an upper surface of the flexible electrode plate while pushing out excess dispersion liquid, thereby bonding them together.

On the other hand, Patent Document 2 describes a method of sealing cells using a solution or a solution mixture that is immiscibile against dispersion liquid and has a specific gravity smaller than the specific gravity of the dispersion solution, and a sealing composition containing thermoplastic elastomer. As the sealing composition has a smaller specific gravity than the specific gravity of the dispersion liquid, it is separated from and above an upper layer of the dispersion liquid, and the sealing composition in such a separated state is hardened, thereby enabling sealing of each of the cells.

It is important to prevent air (bubbles) from entering each of the cells when the dispersion liquid is contained in each of the cells. In this respect, according to the method described in Patent Document 1, sealing is conducted by mechanically applying a pressure force. Therefore air bubbles may enter in the cell depending on the amount of the dispersion liquid contained in the cell.

On the other hand, according to the method described in Patent Document 2, unless there is a sufficient difference in specific gravity between the dispersion liquid and the sealing composition, it is difficult to selectively separate the sealing composition from the upper layer of the dispersion liquid. Therefore, it is difficult to control the amount of the dispersion liquid to be sealed inside each of the cells, which may cause variations in the amount of the dispersion liquid.

SUMMARY

In accordance with some embodiments of the invention, when sealing dispersion liquid containing electrophoretic particles in cells, it is possible to suppress gas such as air (bubbles) from entering each of the cells with a simple method.

In accordance with other embodiments of the invention, it is also possible to provide effects that can only be derived from the composition of each of the embodiments to be described below, and that cannot be obtained by the conventional art.

An embodiment of the invention pertains to a sealing method applicable to a cell matrix equipped with a plurality of cells spatially divided by a partition for sealing dispersion liquid containing hydrophobic dispersion medium and electrophoretic particles dispersed therein in the cells. The method includes supplying the dispersion liquid in the cells through an opening section of a space defined by the partition, and forming a sealing layer at an exposed portion of the dispersion liquid in the opening section, using a polymer reaction at an interface with water. Because this sealing is achieved by the polymer reaction at a liquid phase-to-liquid phase interface, the property of preventing bubbles from entering the dispersion liquid is enhanced. As a result, desired electric fields can be accurately applied to the electrophoretic particles in the cells.

In one aspect, the interface may be formed through floating the cell matrix with the opening section facing vertically downward, or through submerging the cell matrix with the opening section facing vertically upward. By such a simple method, the sealing using the polymer reaction at a liquid phase-to-liquid phase interface can be achieved.

In accordance with another aspect of the embodiment, the step of forming the sealing layer may include the step of adding a surfactant in the water, and then adding a sealing agent from which the sealing layer of polymers is derived by the polymer reaction. In this case, the surfactant and the sealing agent are continuously added in the same water, whereby the sealing process is simplified.

Moreover, the step of forming the sealing layer may include the steps of dipping the opening section in a first solution containing a surfactant, and dipping the opening section in a second solution containing a sealing agent from which the sealing layer of polymer is induced by the polymer reaction. Therefore, for example, a plurality of cell matrixes can be subject to the sealing process in an assembly-line like manner (continuously).

In accordance with an aspect of the embodiment, the surfactant may be gum arabic, and the polymer may be gelatin, or the surfactant may be polyvinyl benzenesulfonate, and the polymer may be melamine-formalin resin.

In accordance with an aspect of the embodiment, in the step of supplying the dispersion liquid in the cell, the dispersion liquid may be supplied in an amount smaller than the volume of the cell. In this case, the sealing layer can be formed in a manner that an opening surface of the cell does not become flash with a sealing surface (the surface of the sealing layer) of the cell, and irregularities according to the differences between the cell opening surface and the sealing surface are created in the sealing surface of the cell matrix, whereby the specular reflection coefficient can be reduced. As a result, a paper-like matte texture can be given to the surface (sealing surface) of the cell matrix.

Furthermore, in accordance with an aspect of the embodiment, a conductive material that forms an electrode for applying electric fields to the electrophoretic particles in the cell may be coated on the sealing layer. By coating the conductive material, necessary electrodes can be formed while maintaining the irregular surface described above.

Another embodiment of the invention pertains to a sealing method applicable to a first cell matrix equipped with a plurality of first cells spatially divided by a first partition and a second cell matrix equipped with a plurality of second cells spatially divided by a second partition for sealing dispersion liquid containing hydrophobic dispersion medium and electrophoretic particles dispersed therein in the plurality of first cells and the plurality of second cells. The method includes supplying the dispersion liquid in the first cells and the second cells through a first opening section of a space defined by the first partition and a second opening section of a space defined by the second partition by dipping the first cell matrix and the second cell matrix together in a state in which one or both of end sections of the first cell matrix and the second cell matrix is affixed to a jig, and forming a sealing layer at an exposed portion of the dispersion liquid in the first opening section and at an exposed portion of the dispersion liquid in the second opening section, using a polymer reaction at an interface with water. This makes it possible to form a sealing layer on the first and second cell matrixes at one once.

In accordance with an aspect of the embodiment, the first and second cell matrixes may be dipped diagonally with respect to a liquid surface of water at a dip angle defined by a surface of the first and second cell matrixes and a surface of the water being greater than 0 degree but smaller than 90 degrees. This makes it possible to suppress generation of liquid flows such as eddy currents around each of the cell matrixes. Therefore, leaking of the dispersion liquid through the opening sections of the matrixes that may be caused by the liquid flows can be suppressed.

The surface of the first and second cell matrixes that defines the dip angle with respect to the liquid surface may be a surface where the first and the second opening sections are formed. In this case, the cell matrixes are dipped in a state in which the surface where the opening sections of the cell matrixes are formed faces the liquid surface, whereby leakage of the dispersion liquid out of the opening sections of the cell matrixes can be effectively suppressed.

Furthermore, after dipping the first and second cell matrixes diagonally, the posture of the cell matrixes may be adjusted so that the first and second opening sections face vertically downward. In this case, generation of liquid flows such as eddy currents around each of the cell matrixes can be more effectively suppressed.

Furthermore, in accordance with an embodiment of the invention, an electrophoretic display is equipped with a cell matrix having the dispersion liquid sealed in the cells by using the sealing method describe above. As the electrophoretic display is equipped with the cell matrix sealed by using a polymer reaction at a liquid phase-to-liquid phase interface, desired electric fields can be accurately applied to the electrophoretic particles in the cells, and the display performance of the electrophoretic display can be improved.

DESCRIPTION OF EXEMPLARY EMBODIMENTS

Figure 1:
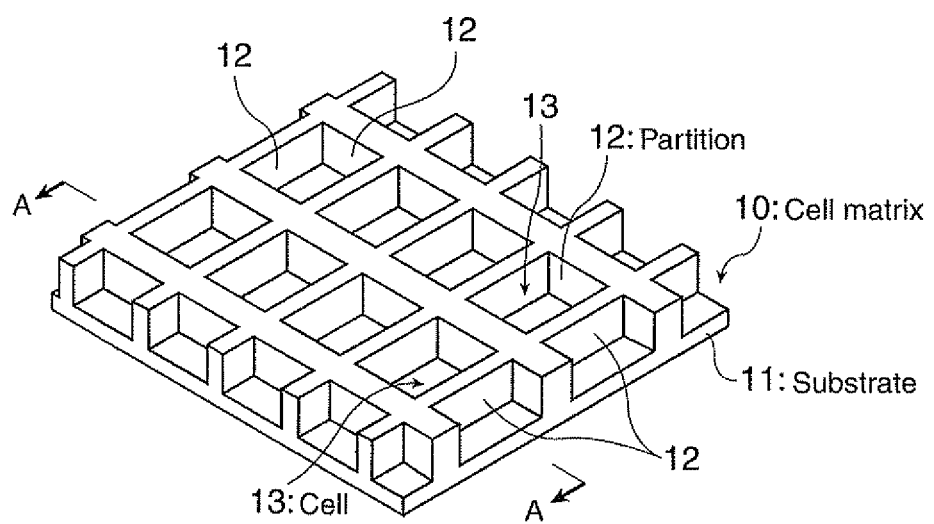
FIG. 1 is a schematic perspective view in part of a cell matrix that is applicable to a display section (a display) of an electronic apparatus such as an EPD and the like in accordance with an embodiment of the invention.
Figure 2A:
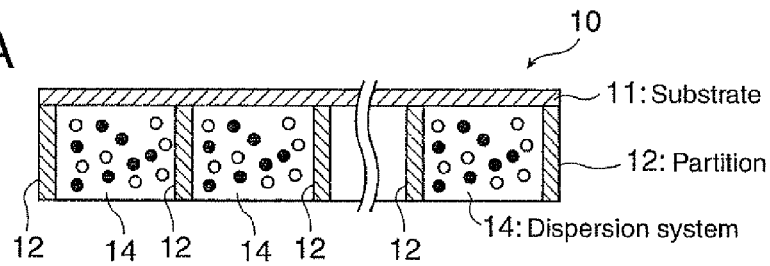
FIG. 2 shows schematic cross-sectional views explaining a sealing method of sealing a dispersion system in cells in accordance with an embodiment of the invention.
Figure 2B:
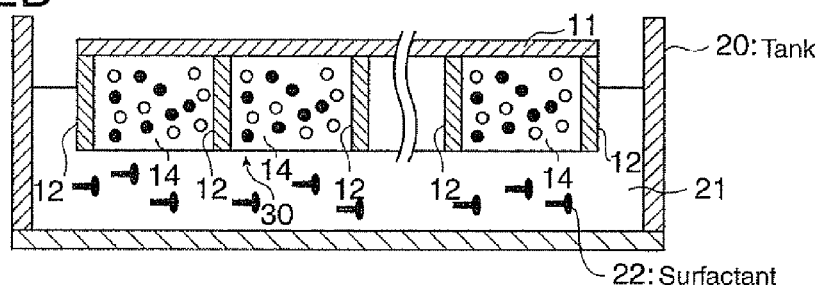
Figure 2C:
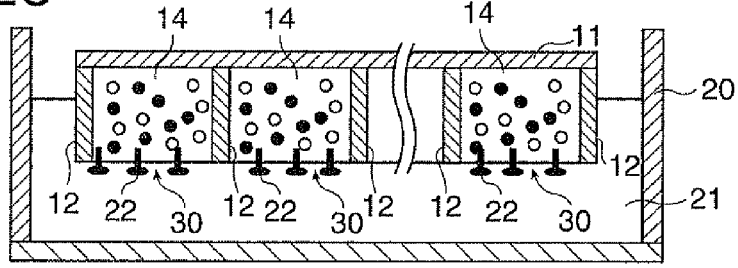
Figure 2D:
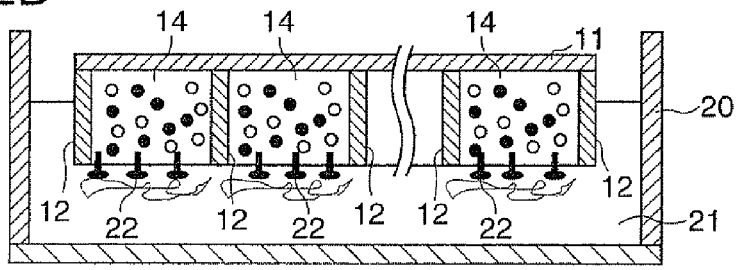
Figure 2E:
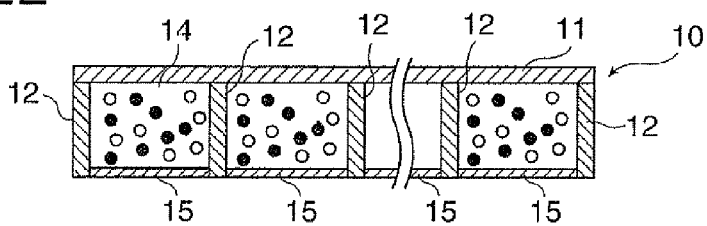

Preferred embodiments of the invention are described below with reference to the accompanying drawings. It is noted that embodiments to be described below are exemplary illustrations, and are not intended to exclude applications of various modifications and technology that are not explicitly stated hereunder. In other words, the invention can be implemented with various modifications (through combining the embodiments and the like) within the range that does not depart from the subject matter. In the descriptions of the drawings, identical or similar components are appended with identical or similar reference numerals. The drawings are schematic presentations, and do not necessarily match with the actual measurements or ratios. The drawings may contain portions that are mutually different in their measurement relations and ratios.

First Embodiment

FIG. 1 is a schematic perspective view in part of a cell matrix that is applicable to a display section (a display) of an electronic apparatus such as an EPD and the like in accordance with an embodiment of the invention. The cell matrix illustrated in FIG. 1 is equipped with a substrate 11, and a plurality of recesses (cells) 13 that are spatially divided by partitions 12 on one surface of the substrate 11.

The substrate 11 may be made of a glass substrate, or a sheet-like member having flexibility. By using a flexible sheet member as the substrate 11, a freely deformable display section, such as, for example, an electronic paper can be obtained. As a material of the flexible sheet member, for example, polyolefin, liquid crystal polymer and thermoplastic elastomer, and copolymers, blends or polymer alloys mainly constituted of the above materials may be used. One or more of these materials may be used independently or in combination. The thickness of the sheet member can be arbitrarily set, while balancing between its flexibility and strength as an EPD, and may be about 20-500 μm, as an example without any particular limitation.

The partition 12 may be obtained by forming a wall section (protrusions) having a predetermined patter on one surface of the substrate 11. As an example of the method of forming such protrusions, an ink jet method (a droplet ejection method), a printing method such as a screen printing method, a photolithography method and the like may be enumerated. As another example, the partitions 12 can also be formed through forming a layer of material for forming the protrusions on the substrate 11, and then performing mechanical, physical or chemical etching, or performing mechanical processing with laser, embossing or the like, or blasting treatment on the layer according to a predetermined pattern.

As a constituent material of the partitions 12, various kinds of resin materials, such as, epoxy-based resin, acryl-based resin, urethane-based resin, melamine-based resin and phenol-based resin; and various kinds of ceramics materials, such as, silica, alumina, titania ceramics and the like can be enumerated. One or more types selected from among these resin materials may be used. An average height of the partitions 12 in a direction perpendicular to the substrate 11 may be about 10-500 μm, as an example without any particular limitation.

Each of cells 13 surrounded by the partitions 12 may be made to correspond to, for example, each pixel that is a display unit of an image or the like. An opening of the cell 13 may have any shape, such as, a triangle, a quadrilateral, a hexagon, an oval or the like. For example, the opening of each cell 13 may be formed in a hexagonal shape, thereby forming a cell pattern in a honeycomb configuration. As a result, the mechanical strength of the EPD as a display section can be improved.

A solution (a dispersion system) containing a predetermined solvent (dispersion medium) and at least one type of electrophoretic particles dispersed (suspended) therein is supplied in each of the cells 13. As a method of supplying the dispersion system in the cells 13, various coating methods, for example, a dipping method of dipping the cell matrix 10 in the dispersion system, a dripping method using a disperser, an ink jet method (a droplet ejection method), a spin coat method, a dip coat method, a spray coat method and the like may be used. The use of a dripping method or an ink jet method allows selective supply of the dispersion system to target cells 13. Therefore, the dispersion system can be reliably supplied in the cells 13 without any wastes. It is noted that the direction in which the dispersion system is supplied to each of the cells 13 is not necessarily limited to the vertical downward direction, and may be sideway or in a vertical upward direction.

As the dispersing medium, a solvent that may be used in electrodeposition or liquid development agent for electrostatic imaging and other various liquids can be used. For example, alcohol-based solvents such as ethanol, esters such as amyl acetate, terpenes such as turpentine, aliphatic hydrocarbons such as petroleum, aromatic hydrocarbons such as toluene and benzene, various kinds of oil (hydrophobic organic solvents) may be used. The aforementioned materials may be used in combination and colored. For colorization, various dyes can be used, such as, anthraquinone-based dyes, azo-based dyes, indigoid-based dyes, triphenylmethane-based dyes and the like can be used.

The electrophoretic particles dispersed in the dispersing medium are charged particles that are electrically charged (have an electrical charge), and electrophoretically move in the dispersion liquid when electric fields are applied thereto from outside (by electrodes not shown). As the electrophoretic particles, at least one type of pigment particles, resin particles and composite particles thereof may preferably be used.

As a pigment composing the pigment particles, for example, it is possible to use a black pigment such as aniline black, carbon black or the like; a white pigment such as antimony oxide or the like; an azo-based pigment such as monoazo, disazo, polyazo or the like; a yellow pigment such as isoindolinone, chrome yellow, iron oxide yellow or the like; a red pigment such as quinacridone red, chrome vermilion or the like; a blue pigment such as phthalocyanine blue, indanthrene blue or the like; and a green pigment such as phthalocyanine green or the like. One or a combination of two or more of these pigments may be used.

Also, as a resin material that composes the resin particles, for examples, acryl-based resin, urethane-based resin, urea-based resin, epoxy-based resin, polystyrene, polyester and the like can be enumerated. One or a combination of two or more of these resin materials may be used. As the composite particles, for example, particles produced by coating surfaces of the pigment particles with the resin material or other pigment; particles produced by coating surfaces of the resin particles with the pigment; and particles made of a mixture obtained by mixing the pigment and the resin material in a suitable composition ratio can be enumerated.

As the particles produced by coating the surfaces of the pigment particles with the other pigment, for example, particles obtained by coating surfaces of titanium oxide particles with silicon oxide or aluminum oxide can be exemplified. Such particles can be used as white particles. Also, carbon black particles or particles produced by coating surfaces thereof may be used as colored particles (black particles).

By appropriately selecting the types (colors) of the electrophoretic particles and/or the dispersion mediums to be sealed in the cells 13, the display color of the cells 13 can be set to white or black, one of three primary colors of red, green and blue (RGB) or one of three primary colors of cyan (C), magenta (M) and yellow (Y). Accordingly, monochrome displays and color displays are made possible.

After supplying the dispersion system in each of the cells 13, the opening section of each of the cells 13 is sealed, whereby a display section usable for an EPD can be composed. At the time of sealing, in accordance with the embodiment example, a surfactant (dispersion agent) having hydrophobic groups and hydrophilic groups is adsorbed in a liquid phase-to-liquid phase interface that is formed by dipping an exposed portion (that is hydrophobic) of the dispersion system at the opening section of the cell 13 in a (hydrophilic) liquid. Then, by causing a polymer reaction (so-called an emulsion polymerization) of a material (for example, crosslinkable hydrophobic monomers) from which polymer (hereafter also referred to as "organic polymer) is derived at the interface, a sealing layer of the organic polymer is formed thereby sealing the dispersion system in the cells 13. As the sealing is achieved by the polymer reaction at a liquid phaseto-liquid phase interface, entering of gas such as air (bubbles) in the cells 13 can be readily suppressed.

As the hydrophilic liquid that forms the interface with the liquid phase of the dispersion system, a solution in which a surfactant dissolved in water may be exemplified. The surfactant may have been dissolved in water prior to forming the interface with the dispersion system, or may be added and dissolved in water after forming the interface with the dispersion system, as described below.

As the surfactant, for example, gum arabic, polyvinyl benzenesulfonate or the like may be used. As a polymer that forms the sealing layer, for example, gelatin, melamine-formalin resin or the like may be used. As examples of preferred combinations, a combination of gum arabic as the surfactant and gelatin as the polymer, and a combination of polyvinyl benzenesulfonate as the surfactant and melamine-formalin resin as the polymer may be enumerated. As the surfactant, any one of anionic, cationic, nonionic and amphoteric surfactants can be used.

An example of the sealing method in accordance with the embodiment will be described with reference to FIG. 2, FIG. 2 shows cross-sectional views of the cell matrix 10 taken along lines A-A in FIG. 1.

First, as an example of the first step, the dispersion system 14 is supplied in each of the cells 13. Then, as schematically illustrated in (1) and (2) in FIG. 2, the cell matrix 10 is floated on a liquid 21 in a tank 20 with the opening section of each of the cells facing vertically downward. In this instance, the cell matrix 10 may be dipped in a diagonal direction with respect to the liquid surface of the liquid 21, whereby the probability of gas such as air (bubbles) entering an interface 30 between the cell matrix 10 and the liquid 21 can be reduced.

It is noted that, when the opening section of each of the cells 13 of the cell matrix 10 faces vertically downward, gravity works on the dispersion system 14 supplied in each of the cells 13. However, by appropriately setting the aperture area of each of the cells 13 and the height of each of the partitions 12, the dispersion system 14 can be retained within each of the cells 14 by the surface tension acting on the dispersion system 14.

The liquid 21 within the tank 20 is a solution that contains a surfactant 22 at least after forming an interface with the dispersion system in the cell 13. In other words, the surfactant 22 may have been dissolved in advance before the cell matrix 10 is floated on the liquid 21 in the tank 20, or may be added and dissolved after the cell matrix 10 is floated on the liquid 21 in the tank 20.

Then, as schematically illustrated in (3) of FIG. 2, the surfactant 22 in the solution 21 preferentially aggregates at the interface 30 with the dispersion system 14 (more precisely, dispersion medium that is an organic solvent) that presents an oily component exposed in the opening section of the cells 13 due to its adsorption behavior, and adsorbs to the dispersion medium whose hydrophobic groups (lipophilic groups) are the oily component.

In this state, as schematically illustrated in (4) of FIG. 2, a material (for example, crosslinkable hydrophobic monomer) from which organic polymer is derived by polymer reaction is additionally added in the solution 21 in the tank 20 as a sealing agent. The method in which the surfactant 22 and the sealing agent are sequentially (continuously) added to the hydrophilic liquid (water) 21 in the tank 20 in a manner described above is called a continuous process. According to the continuous process, the sealing process can be simplified compared to a batch method to be described below. The addition of the sealing agent causes a polymer reaction to take place at the interface 30 where the surfactant 22 preferentially aggregates, and as schematically illustrated in (5) of FIG. 2, a sealing layer (sealing film) 15 of organic polymer that is derived from the monomer is formed at each of the cells 13, thereby sealing the opening section of each of the cells 13 (the second step).

Accordingly, when the dispersion system 14 is sealed in each of the cells 13, the probability of bubbles entering in the cells 13 can be suppressed to the minimum (in other words, the ability of preventing bubbles and the like from entering and mixing with the dispersion system 14 can be enhanced). As a result, this makes it possible to apply desired electric fields to the electrophoretic particles within each of the cells 13, the efficiency in controlling the electrophoretic particles inside the dispersion system 14, and the display performance of the EPD can be improved. Furthermore, the use of polymer reaction at the liquid phase-to-liquid phase interface 30 improves the flatness of the formed sealing layer 15. Also, as described below in other embodiments, the sealing layer 15 can be formed at lower temperatures than the related art technology.

By controlling the amount of dispersion system 14 to be supplied to the cells 13, the sealing layer 15 can be formed in a manner that its surface is positioned at an arbitrary position with respect to a height direction of the partitions 12 (i.e., a direction vertically away from the surface of the substrate 11). For example, as exemplified in (5) of FIG. 2, the sealing layer 15 can be formed in a manner that the surface of the sealing layer 15 is leveled in the same plane with an opening surface of the cells 13 (the end surface of the partitions 12). Accordingly, the flatness of the sealing surface of the cell matrix 10 and, consequently, the surface of the display section of the EPD can be improved.

Figure 3:
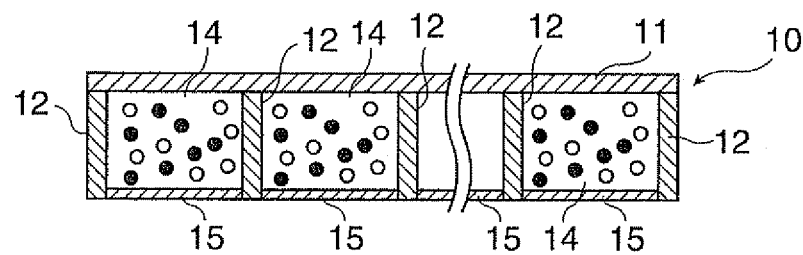
FIG. 3 shows a schematic cross-sectional view explaining a forming position of a sealing layer in accordance with an embodiment of the invention.

Also, as schematically illustrated in FIG. 3, the amount of the dispersion system 14 that is supplied to each of the entire cells 13 or to a part thereof may be controlled to an amount that is smaller than the space (volume) of each of the cells 13. In other words, it is possible to form the sealing layer 15 such that the opening surface of the cell 13 does not coincide with the sealing surface of the cell 13 (i.e., the surface of the sealing layer 15).

In this case, the mechanical strength of the EPD as a display section can be improved, compared to the case of forming a sealing layer that uniformly covers the opening section of each of the cells 13. Also, the partitions 12 are caused to partially protrude from the periphery of the sealing layer 15, and therefore the partitions 12 can reduce incidents in which an external force is directly applied to the sealing layer 15. Accordingly the probability of the sealing layer 15 being damaged by such external forces can be reduced. Moreover, irregularities are generated in the sealing surface of the cell matrix 10 according to differences between the opening surface of the cells 13 and the sealing surface, whereby the specular reflection coefficient can be reduced. As a result, a paper-like matte surface can be given to the surface (sealing surface) of the cell matrix 10, which is therefore useful to be used as a display section of the EPD such as an electronic paper and the like.

It is noted that the display section of the present exemplary embodiment can also be applied, without any particular limitation to the electronic paper, to display sections of various kinds of electronic apparatuses, such as, a television set, a video tape recorder, a car navigation system, a pager, an electronic notebook, an electronic calculator, an electronic newspaper, a word processor, a personal computer, a workstation, a TV phone, a POS terminal, a device provided with a touch panel and the like.

An electrode for applying electric fields to the electrophoretic particles in the dispersion system 14 may be formed on the sealing surface of the cell matrix 10 if necessary. The electrode may be formed by coating an organic conductive material thereon, or may be formed by bonding an electrode material in a sheet shape thereon. At least in the case of coating an organic conductive material, the irregularities (matte appearance) generated on the sealing surface of the cell matrix 10 can be retained.

As the method of supplying the surfactant 22 and the sealing agent to the interface 30, in addition to the continuous process described above, it is also possible to use a method (a batch method) in which a first solution containing the surfactant 22 and a second solution containing monomers are prepared independently, and the opening section of each of the cells 13 of the cell matrix 10 is sequentially dipped in each of the solutions. According to the batch method, for example, the sealing process can be applied to a plurality of cell matrixes 10 in an assembly-line like manner (continuously), such that the sealing process can be performed on a large amount of cell matrixes 10 in a short period of time.

Figure 4:
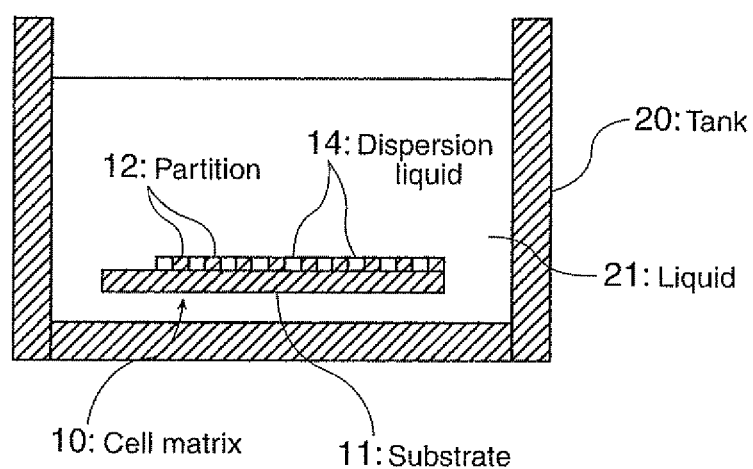
FIG. 4 is a schematic cross-sectional view showing a state in which the cell matrix exemplified in FIGS. 1-3 is submerged in a liquid in a tank.

Furthermore, in the example described above, the surfactant 22 and the sealing agent may be supplied to the interface 30 in a manner schematically shown in FIG. 4, for example, in a state in which the cell matrix 10 is sunken in the liquid 21 within the tank 20 with the opening section of each of the cells 13 of the cell matrix 10 facing vertically upward. This makes it possible to reduce the possibility of bubbles entering the interface 30 more readily than the case where the cell matrix 10 is floated on the liquid 21 with the opening section of the cells being faced vertically downward. It is noted that even if the entire cell matrix 10 is sunken in the liquid 21, the hydrophobic dispersion system 14 can be retained in the cells 13, because the dispersion system 14 has higher affinity with the organic substrate 11 and the partitions 12 than with the solution 21.

Non-limiting embodiment examples 1 and 2 of the sealing (closing) method described above will be described below. The embodiment example 1 refers to a process example in which gum arabic is used as the surfactant 22, and gelatin is used as organic polymer that is derived by polymer reaction. The embodiment example 2 refers to a process example in which polyvinyl benzenesulfonate is used as the surfactant 22, and melamine-formalin resin is used as organic polymer that is derived by polymer reaction.

Embodiment Example 1

Gelatin

Gum Arabic Sealing (1) After cleaning, the cell matrix 10 is dipped in the dispersion system 14 to supply the dispersion system 14 to each of the cells 13. Then, the dispersion system 14 over the opening section of each of the cells 13 of the cell matrix 10 is smoothed flat with a metal spatula or the like to remove excess portion of the dispersion system 14.

(2) Then, the opening section of the cell matrix 10 is dipped in a 0.2 wt % gum arabic solution at room temperature for about one hour.

(3) Thereafter, the opening section of the cell matrix 10 is dipped in a gelatin containing solution that is a 0.2 wt % gelatin–10 wt % acetic acid solution at 43° C. for about two hours, and then cooled to a low temperature (for example 0° C.). By heating in an acidic condition, the polymer reaction can be promoted.

(4) In the state at 0° C., the opening section of the cell matrix 10 is dipped and kept in a 10 wt % formalin solution for about two hours. By this, formalin cross-linking (hardening) is promoted. It is noted that, by dipping it in a formalin solution in a low temperature environment, excessive cross-linking (hardening) can be suppressed.

(5) Then, the opening section of the cell matrix 10 is dipped and kept in a 10 wt % $Na_2CO_3$ solution at room temperature for neutralization and alkalization for about one hour, thereby promoting the cross-linking (hardening).

(6) Thereafter, the cell matrix 10 is baked and dried at 45° C. for about 15 minutes.

Embodiment Example 2

Melamine Sealing (1) After cleaning, the cell matrix 10 is dipped in the dispersion system 14 to supply the dispersion system 14 to each of the cells 13. Then, the dispersion system 14 over the opening section of each of the cells 13 of the cell matrix 10 is smoothed flat with a metal spatula or the like to remove excess portion of the dispersion system 14.

(2) Then, the opening section of the cell matrix 10 is dipped in a 1 wt % polyvinyl benzenesulfonate solution at room temperature for about 30 minutes.

(3) Thereafter, the opening section of the cell matrix 10 is dipped in a 1 wt % melamine-formalin pre-polymer –10 wt % acetic acid solution at 60° C. for about one hour. The melamine-formalin pre-polymer solution can be prepared by mixing, for example, 1 g of melamine, 1 g of formalin, 5 g of 40% formaldehyde solution and 0.4 g of 20% ammonia solution, and heating the mixture at 70° C.

(4) Thereafter, the cell matrix 10 is baked and dried at 45° C. for about 15 minutes.

Embodiments for Dipping Cell Matrix 10 in Liquid 21

When dipping the cell matrix 10 in the liquid 21 within the tank 21, plural cell matrixes 10 supplied with the dispersion system 14 may be dipped together in the liquid 21. By this, the dispersion system 14 can be supplied in the cells of each of the cell matrixes through the opening sections of spaces of the cells defined by the partitions of each of the cell matrixes 10, and interfaces with the liquid 21 are formed at exposed portions of the dispersion system 14 at the opening sections of each of the cell matrixes 10, and thus the sealing layers 15 described above can be formed in a batch. Accordingly, the manufacturing cost can be reduced and the manufacturing time can be shortened.

Figure 5:
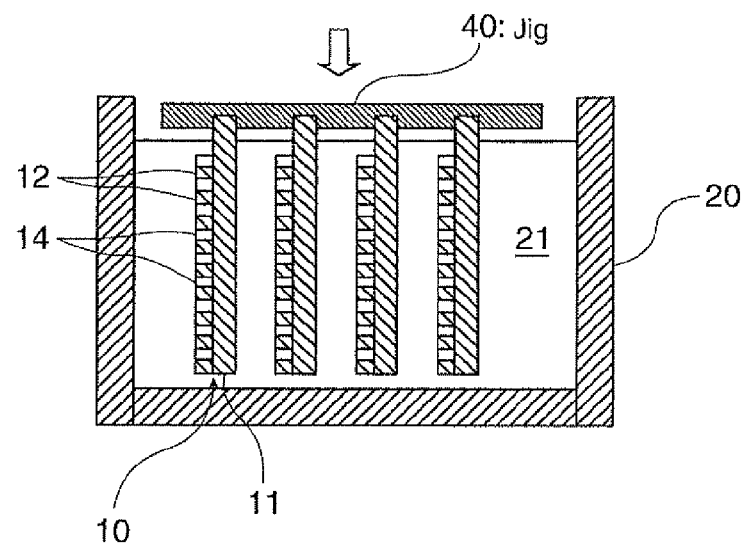
FIG. 5 is a schematic cross-sectional view showing an example in which the cell matrix exemplified in FIGS. 1-3 is submerged in a liquid in a tank in accordance with an embodiment of the invention.

For example, as schematically shown in FIG. 5, a plurality of (for example, four as illustrated) cell matrixes 10 are affixed at one ends thereof to a jig 40 at predetermined intervals, and the cell matrixes 10 are dipped together in the liquid 21 with their other ends being submerged first. In this instance, an angle (hereafter referred to as a "dip angle") defined between the surface of each of the cell matrixes 10 and the liquid surface of the liquid 21 is 90 degrees, and by slowly submerging each of the cell matrixes 10 diagonally in the liquid 21, leakage of the dispersion liquid 14 through the partitions 12 of the cell matrixes 10 can be suppressed as much as possible.

Figure 6:
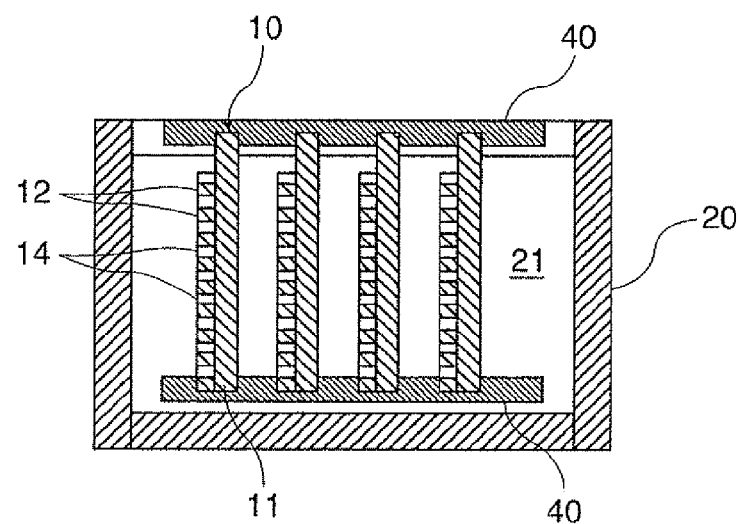
FIG. 6 is a schematic cross-sectional view showing another example in which the cell matrix exemplified in FIGS. 1-3 is submerged in a liquid in a tank in accordance with an embodiment of the invention.

Also, as schematically shown in FIG. 6, both ends of the cell matrixes 10 are affixed to jigs 40 with an appropriate tension being applied to the cell matrixes 10, and each of the cell matrixes 10 in this state may be dipped in the liquid 21, in a similar manner as the example shown in FIG. 5. In this case, the both ends of each of the cell matrixes 10 is affixed to the jigs 40 and an appropriate tension is applied to the cell matrixes 10, such that generation of deforms such as bends and twists of the cell matrixes 10 at the time of dipping can be suppressed as much as possible. Accordingly, leakage of the dispersion liquid 14 through the partitions 12 of the cell matrixes 10 can be suppressed better.

Figure 7:
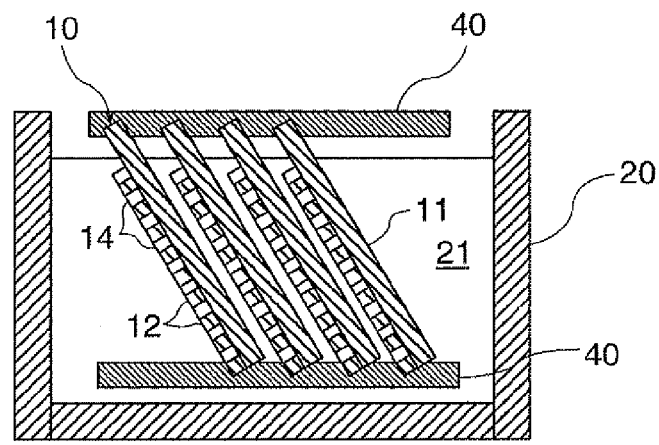
FIG. 7 is a schematic cross-sectional view showing an example in which the cell matrix exemplified in FIGS. 1-3 is diagonally submerged in a liquid in a tank in accordance with an embodiment of the invention.
Figure 8:
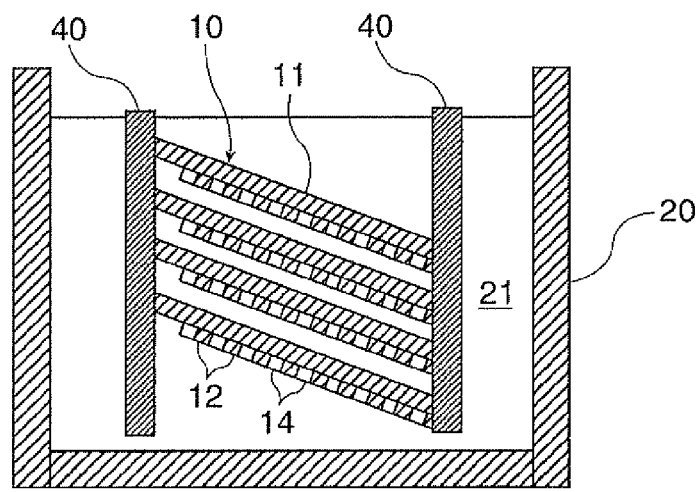
FIG. 8 is a schematic cross-sectional view showing another example in which the cell matrix exemplified in FIGS. 1-3 is diagonally submerged in a liquid in a tank in accordance with an embodiment of the invention.

The dip angle ($\alpha$) of each of the cell matrixes 10 with respect to the liquid surface of the liquid 21 may be at an angle shifted from 90 degrees. In other words, each of the cell matrixes 10 may be dipped with a dip angle ranging between 0 degree and 90 degrees ($0°<\alpha<90°$. For example, as schematically shown in FIG. 7 and FIG. 8, the dip angle $\alpha$ ($<90°$) can be selected such that the direction of openings of the opening sections of the cell matrixes 10 filled with the dispersion liquid 14 is oriented in a direction shifted from the horizontal surface toward the vertical downward direction. In this case, one of the surfaces of the cell matrix 10 in which the opening sections of the cell matrix 10 are formed defines the dip angle $\alpha$ with respect to the liquid surface of the liquid 21. FIG. 8 exemplifies a state in which the dip angle is smaller than that shown in FIG. 7 (closer to the horizontal direction).

By setting the dip angle $\alpha$ in a manner described above, leakage of the dispersion liquid 14 through the partitions 12 of the cell matrixes 10 in the dipping process can be more effectively suppressed. Noted that, the smaller the dip angle $\alpha$, the greater the effect of reducing leakage of the dispersion liquid 14 through the partitions 12 of the cell matrixes 10 in the dipping process can be expected. However, if the dip angle $\alpha$ is excessively small, this may cause water currents such as eddy currents to be generated around the cell matrix 10 depending on the dipping speed, causing rather negative effects. Therefore, the dip angle may be set at an angle that can satisfy, for example, specified manufacturing quality and manufacturing time based on empirical values and the likes.

Figure 9:
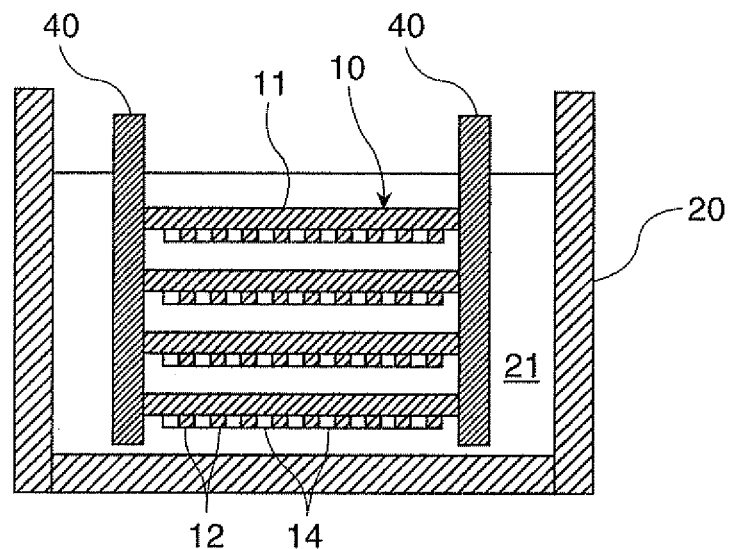
FIG. 9 is a schematic cross-sectional view showing an example in which the cell matrix exemplified in FIGS. 1-3 is horizontally submerged in a liquid in a tank in accordance with an embodiment of the invention.

By appropriately selecting the dipping speed, the dip angle $\alpha$ of each of the cell matrixes 10 may be set to 0 degree as exemplified in FIG. 9. Specifically, the dip angle $\alpha$ of each of the cell matrixes 10 can be appropriately selected from angles in the range of 0 degree $\leq \alpha \leq 90$ degrees.

Figure 10:
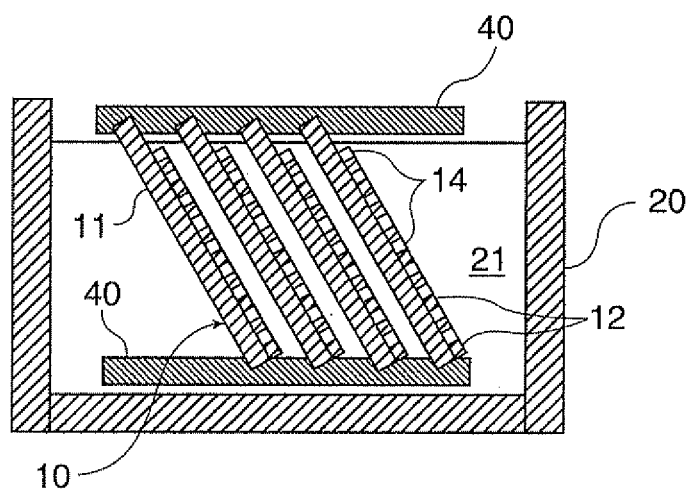
FIG. 10 is a schematic cross-sectional view showing still another example in which the cell matrix exemplified in FIGS. 1-3 is diagonally submerged in a liquid in a tank in accordance with an embodiment of the invention.
Figure 11:
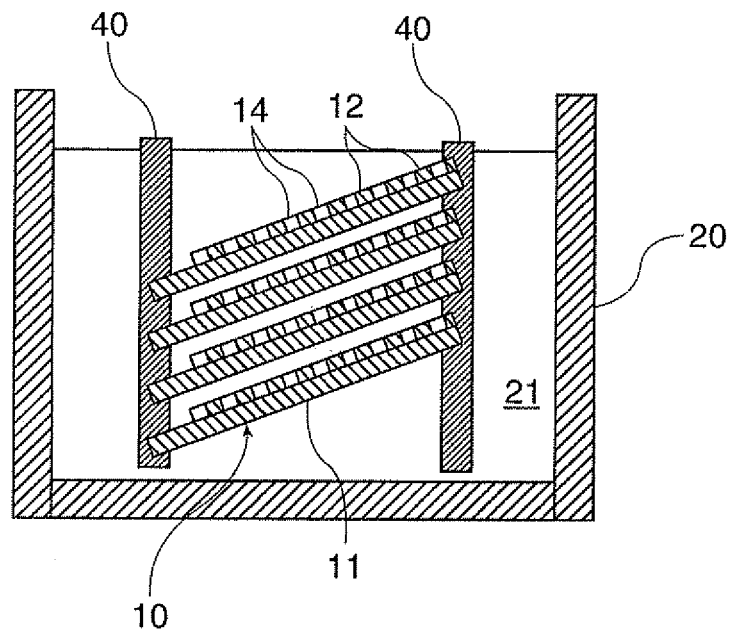
FIG. 11 is a schematic cross-sectional view showing yet another example in which the cell matrix exemplified in FIGS. 1-3 is diagonally submerged in a liquid in a tank in accordance with an embodiment of the invention.
Figure 12:
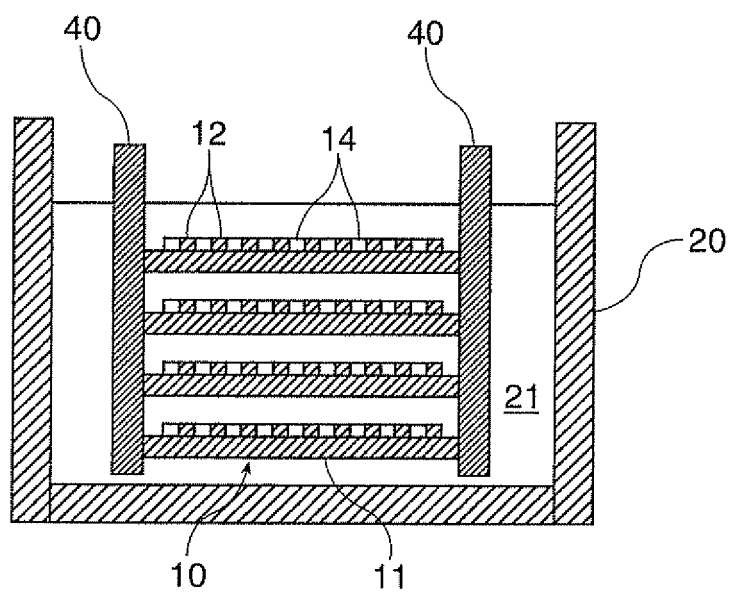
FIG. 12 is a schematic cross-sectional view showing another example in which the cell matrix exemplified in FIGS. 1-3 is horizontally submerged in a liquid in a tank in accordance with an embodiment of the invention.

Also, the dip angle $\alpha$ of each of the cell matrixes 10 may be set such that the openings of the opening sections of the cell matrixes 10 filled with the dispersion liquid 14 are oriented in a direction shifted from the horizontal surface toward the vertical upward direction, as exemplified in FIG. 10-FIG. 12. In this case, the other surface of the cell matrix 10 opposite to the surface where the opening sections of the cell matrix 10 are formed defines the dip angle $\alpha$ with respect to the liquid surface of the liquid 21. The dipping methods of the embodiments exemplified in FIGS. 10-12 may make it easier for the dispersion liquid 14 to leak through the partitions 12 of the cell matrixes 12, compared to the dipping methods of the embodiments exemplified in FIGS. 7-9. However, leakage of the dispersion liquid 14 can be suppressed by appropriately selecting the dipping speed.

The jig 40 may be shaped for flow regulation to have a streamlined cross-sectional shape in its dipping direction in order to reduce the resistance of the liquid 21 that works on the jig 40 at the time of dipping, thereby suppressing generation of water currents in the liquid 21 around the cell matrix 10 as much as possible.

The cell matrixes 10 may be affixed to the jig 40 at regular intervals, or a part or all of the intervals may differ from one another. Further, adjacent ones of the cell matrixes 10 may not necessarily be parallel to each other, and a part or all of the cell matrixes 10 may be affixed to the jig 40 at mutually different angles. The intervals between the cell matrixes 10 and the mounting angle of each of the cell matrixes 10 to the jig 40 may be appropriately individually selected in order to suppress as much as possible the generation of liquid currents that may cause leakage of the dispersion liquid 14 at the time of dipping.

Furthermore, the postures of the cell matrixes 10 may be adjusted integrally such that each of the cell matrixes 10 is dipped in the liquid 21 diagonally with respect to the liquid surface when they are dipped; and then after having been submerged in the liquid, the cell matrixes 10 may be moved into a horizontal posture (for example, in a manner that the direction of the openings of the opening sections filled with the dispersion liquid 14 faces vertically downward). Such an adjustment could be made, for example, in a manner that the angle $\alpha$ is gradually changed closer to 0° to change the state of the cell matrixes 10 shown in FIG. 7 through the state shown in FIG. 8 to the state shown in FIG. 9. As a result, generation of liquid flows such as eddy currents around each of the cell matrixes 10 can be suppressed to the minimum, and leakage of the dispersion liquid 14 through the partitions 12 of the cell matrixes 10 can be more effectively suppressed. Moreover, the sealing layer 15 is formed after the cell matrixes 10 have been leveled and the interface of the dispersion system 14 has been leveled, such that the cell matrixes 10 with a uniform thickness can be readily formed.

What is claimed is:

1. A method for sealing a dispersion liquid in a cell matrix that comprises a plurality of cells spatially divided by a partition, the method comprising:
   (a) supplying the dispersion liquid into the plurality of cells through openings in the plurality of cells such that the surface of the dispersion liquid is equal to or lower than the height of the partition, the dispersion liquid containing electrophoretic particles dispersed in a hydrophobic dispersion medium;
   (b) submerging the cell matrix in an aqueous liquid or floating the cell matrix on an aqueous liquid such that the openings in the plurality of cells are submerged in the aqueous liquid; and
   (c) forming a sealing layer over the openings in the plurality of cells at an interface of the dispersion liquid and the aqueous liquid by a polymer reaction.

2. The method according to claim 1, wherein, in step (b), the cell matrix is floated on the aqueous liquid.

3. The method according to claim 1, wherein, in step (b), the cell matrix is submerged in the aqueous liquid.

4. The method according to claim 1, wherein step (c) comprises providing a surfactant in the aqueous liquid and then providing, in the aqueous liquid, a sealing agent that forms the sealing layer by the polymer reaction.

5. The method according to claim 1, wherein step (b) comprises submerging the openings in the plurality of cells in a first aqueous solution containing a surfactant, and submerging the openings in the plurality of cells in a second aqueous solution containing a sealing agent that forms the sealing layer by the polymer reaction.

6. The method according to claim 4, wherein the surfactant includes gum arabic and the sealing agent is gelatin.

7. The method according to claim 4, wherein the surfactant includes polyvinyl benzenesulfonate and the sealing agent is a melamine-formalin resin.

8. The method according to claim 1, wherein, in step (a), the dispersion liquid is supplied into each of the plurality of cells in an amount smaller than a volume of each of the plurality of cells.

9. The method according to claim 1, further comprising:
(d) coating, on the sealing layer, a conductive material that forms an electrode for applying an electric field to the electrophoretic particles in the plurality of cells.

10. A method for sealing a dispersion liquid in a plurality of cell matrices, each cell matrix comprising a plurality of cells spatially divided by a partition, the method comprising:
(a) supplying the dispersion liquid into the plurality of cells of each cell matrix through openings in the plurality of cells such that the surface of the dispersion liquid is equal to or lower than the height of the partition, the dispersion liquid containing electrophoretic particles dispersed in a hydrophobic dispersion medium;
(b) dipping the plurality of cell matrices in an aqueous liquid such that the openings in the plurality of cells are submerged in the aqueous liquid, the plurality of cell matrices being affixed to a jig; and
(c) forming a sealing layer on each cell matrix that covers the openings in the plurality of cells at an interface of the dispersion liquid and the aqueous liquid by a polymer reaction.

11. The method according to claim 10, wherein the plurality of cell matrixes matrices are diagonally dipped with respect to a surface of the aqueous liquid at a dip angle greater than 0 degree but smaller than 90 degrees.

12. The method according to claim 11, wherein the surface of the plurality of cell matrices that defines the dip angle with respect to the surface of the aqueous liquid is a surface having the openings in the plurality of cells.

13. The method according to claim 11, wherein, in step (b), the openings in the plurality of cells are submerged in the aqueous liquid such that the openings face downward.

* * * * *